United States Patent
Tsun

(10) Patent No.: US 8,429,544 B2
(45) Date of Patent: Apr. 23, 2013

(54) CONTENT SERVER LATENCY DEMONSTRATION

(75) Inventor: Stephen Tsun, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1012 days.

(21) Appl. No.: 11/836,069

(22) Filed: Aug. 8, 2007

(65) Prior Publication Data

US 2009/0044125 A1    Feb. 12, 2009

(51) Int. Cl.
*G06F 3/00* (2006.01)
*H04J 3/06* (2006.01)

(52) U.S. Cl.
USPC .......................................... 715/760; 370/508

(58) Field of Classification Search .................. 715/760, 715/733, 738; 709/224; 370/508
See application file for complete search history.

(56) References Cited

U.S. PATENT DOCUMENTS

| | | | |
|---|---|---|---|
| 6,405,252 B1 | 6/2002 | Gupta et al. | |
| 6,601,098 B1 | 7/2003 | Case | |
| 7,058,706 B1 | 6/2006 | Iyer et al. | |
| 7,475,067 B2 * | 1/2009 | Clary et al. | 1/1 |
| 7,475,089 B1 * | 1/2009 | Geddes | 1/1 |
| 2001/0010059 A1 * | 7/2001 | Burman et al. | 709/224 |
| 2002/0099818 A1 * | 7/2002 | Russell et al. | 709/224 |
| 2002/0120727 A1 * | 8/2002 | Curley et al. | 709/223 |
| 2003/0065763 A1 | 4/2003 | Swildens et al. | |
| 2003/0217147 A1 | 11/2003 | Maynard et al. | |
| 2005/0086602 A1 * | 4/2005 | Philyaw et al. | 715/727 |
| 2006/0253546 A1 * | 11/2006 | Chang et al. | 709/217 |

FOREIGN PATENT DOCUMENTS

JP    2002163185    6/2002

OTHER PUBLICATIONS

International Search Report and Written Opinion for PCT Application No. PCT/US2008/072526, dated Feb. 27, 2009; 15 pages.

* cited by examiner

*Primary Examiner* — Rashawn Tillery
(74) *Attorney, Agent, or Firm* — Armstrong Teasdale LLP

(57) ABSTRACT

A first portion of a content page can be loaded in a first user interface, where the first portion includes content received from a publisher server. A second user interface can then be displayed. A second portion of the content page can be loaded in the second user interface, where the second portion includes one or more content items received from one or more content servers. In addition, one or more attributes associated with the one or more content items can be displayed in the second user interface.

22 Claims, 5 Drawing Sheets

CONTENT SERVER LATENCY DEMONSTRATION

FIELD

This disclosure relates to information retrieval.

BACKGROUND

Content displayed on a web page can be generated by one or more content item servers in response to content item requests that are generated during the rendering of the web page by a client device. The content item requests can be generated synchronously with respect to the rendering of the web page. Likewise, the content items received in response to the content item requests can be processed synchronously with respect to the rendering of the web page. For example, when a web page is rendered, JavaScript may execute and request an advertisement from a first content server. In turn, the first content server may request an advertisement from a second content server. If the advertisement is retrieved synchronously, the rendering of the web page is delayed until a requested advertisement is received from a content server. Once the advertisement is received and rendered, e.g., displayed on the web page, the rendering of the remainder of the web page resumes.

A drawback of synchronous content item retrieval is that if a content item server is slow, then the rendering of the remainder of the web page will be delayed. To mitigate the potential effects of synchronous content item processing, web page publishers attempt to identify the source of the delay, i.e., the content item server that may be slow or temporarily inoperable, and to calculate the total latency times. However, it is often a complex task to compile the multiple HTTP requests and responses from the rendering of a web page in order to calculate the latency times associated with the different servers. For example, the multiple HTTP requests and responses can look unfamiliar, as they do not appear on the web page itself, but are returned by the first content server. Furthermore, if it is determined that a particular server, e.g., the second content server, is the source of the delay, it is difficult to demonstrate the delay to the operator of the second content server.

SUMMARY

Disclosed herein are systems and methods for determining a latency time attributed to a content server. According to some implementations, content is requested, wherein the request is a Uniform Resource Locator (URL) directed to the content, and the URL includes an added argument. The requested content can be loaded into a content page in a first user interface. A second user interface can then be displayed. One or more content items associated with the content page can then be displayed in the second user interface in accordance with the argument added to the URL. In addition, one or more attributes associated with the one or more content items can be displayed in the second user interface.

According to some implementations, a first portion of a content page can be loaded in a first user interface, where the first portion includes content received from a publisher server. A second user interface can then be displayed. A second portion of the content page can be loaded in the second user interface, where the second portion includes one or more content items received from one or more content servers. In addition, one or more attributes associated with the one or more content items can be displayed in the second user interface.

According to some implementations, a system includes a publisher server configurable to transmit a first portion of a content page to a client device, wherein the first portion includes publisher content. Additionally, one or more content servers can be configurable to transmit a second portion of the content page to the client device, where the second portion includes one or more content items. The client device can be configurable to load the first portion of the content page in a first user interface, load the second portion of the content page in a second user interface, and display one or more attributes associated with the one or more content items in the second user interface.

According to some implementations, a system includes a client device configurable to save a copy of one or more content items associated with a content page received from one or more content servers. Additionally, a processor is configurable to generate a user interface; generate a combined source code for the one or more saved content items; and insert the combined source code into the user interface.

According to some implementations, a system includes a publisher server configurable to capture one or more content item identifications associated with one or more content items. A server processor is configurable to generate a user interface; generate a request to a first content server requesting the one or more content items associated with the one or more content item identifications; and render the one or more content items into the user interface.

DETAILED DESCRIPTION

Figure 1:
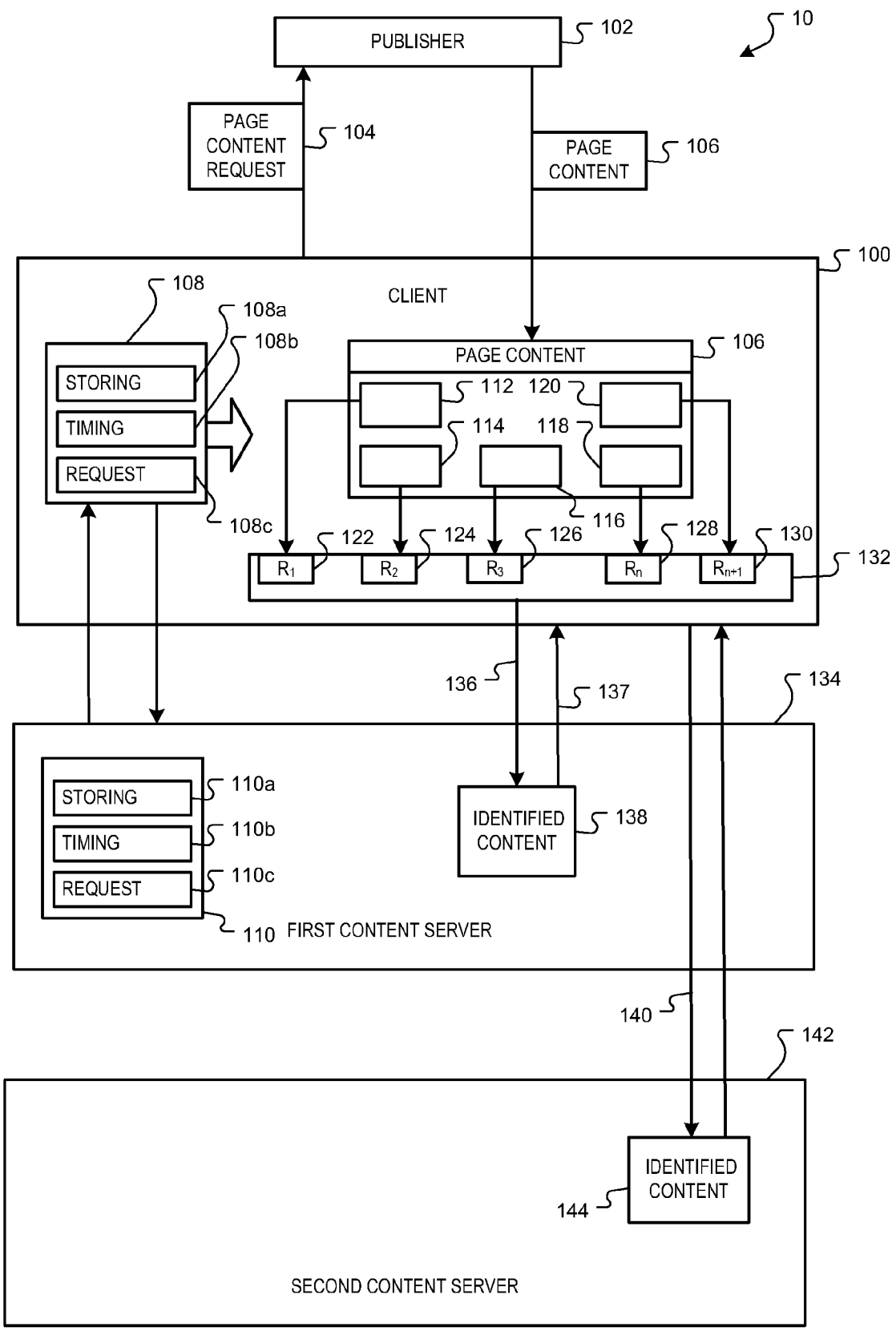
FIG. 1 is a block diagram of an example system for requesting content from a content server.

FIG. 1 is a block diagram of an example system 10 for requesting content from one or more content servers. In one implementation, the content may include advertisements, and the content servers can be content servers. Different types of content can also be requested.

In one implementation, a client system 100 is configured to view content (e.g., visit web pages) accessible through a network, e.g., the Internet. The client system 100 can, for example, be a web browser, or a computing device executing network navigation software, etc. A web address (e.g., Uniform Resource Locator (URL)) visited by the client system 100 can be resolved to identify a publisher 102, e.g. a server, hosting a corresponding web page. In this example, a client system 100 can send a web page content request 104 to the publisher 102 for the web page content 106. The publisher 102, in response to the request, provides the web page content 106 to the client system 100 as, e.g., an HTML document containing JavaScript. The web page content 106 can include one or more content presentations. In an implementation, the content presentations can include advertisement slots for advertisements to be served by a content server. Other content presentations can also be used.

The web page content 106 provided by the publisher 102 includes a reference to a set of instructions 108. In an implementation, the instructions 108 include storing instructions 108a, timing instructions 108b and request instructions 108c that are used to render and present the requested content, e.g., advertisements. In an implementation, the instructions 108 are provided by a first content server 134, e.g., a content server, and are stored at the client system 100, such as in a cache associated with a web browser.

The web page content 106 can define content slots 112-120 that are configured to display content from the one or more content servers. In an implementation, the content slots 112-120 are advertisement slots that are defined within HTML tags. The instructions 108 generate content requests 122-130 that are issued to request content to fill the content slots 112 to 120. In an implementation, the requests 122 to 130 are stored in a data store 132, such as a buffer 132, and then sent to the content server 134 in one or more requests 136.

In an implementation, the first content server 134 processes the received individual or combined requests 136 and returns identified content 138 to the client system 100. In another implementation, the first content server 134 processes the received individual or combined requests 136 from the client system 100 and sends a combined response 137 to the client system 100. For example, the response can be in HTML or JavaScript. The combined response 137 to the client system 100 from the first content server 134 can instruct the client system 100 to send one or more requests 140 to a second content server 142 requesting content items. The second content server 142 can then, for example, return identified content 144 to the client system 100. The identified content 138 and/or 144 can then be displayed as part of the publisher's web page in the corresponding content slots, e.g., content slots 112, 114 and 116.

An example of the first content server 134 can include a Google™ content server. Requests can be made to the Google™ content server to fill content slots on the web page with advertisements. In turn, the Google™ content server can identify and provide advertisements, or the Google™ content server can requests advertisements from the second content server 142, i.e., a third party content server. While reference is made to only two content servers 134 and 142, more than two content servers can provide content to a single web page.

When the client system 100 requests content from the publisher 102, the first content server 134, and/or the second content server 142, latency delays can occur. For example, the latency delays can be related to a variety of issues, such as a slow network speed, the publisher server 102 is slow, the first content server 134 is slow, and/or the second content server 142 is slow. A user of the client system 100 can only see a total latency time it takes for the web page to load. Therefore, determining the latency delay contributions attributed to the publisher server 102, first content server 134, and second content server 142 can be difficult to demonstrate.

However, an example process for determining a source of latency is disclosed in pending application Ser. No. 11/836,019 titled, "CONTENT SERVER LATENCY DETERMINATION" filed on Aug. 8, 2007, the entire contents of which are fully incorporated herein by reference. Based on the example process, it can be determined that the source of the latency is most likely attributed to the second content server 142.

Figure 2:
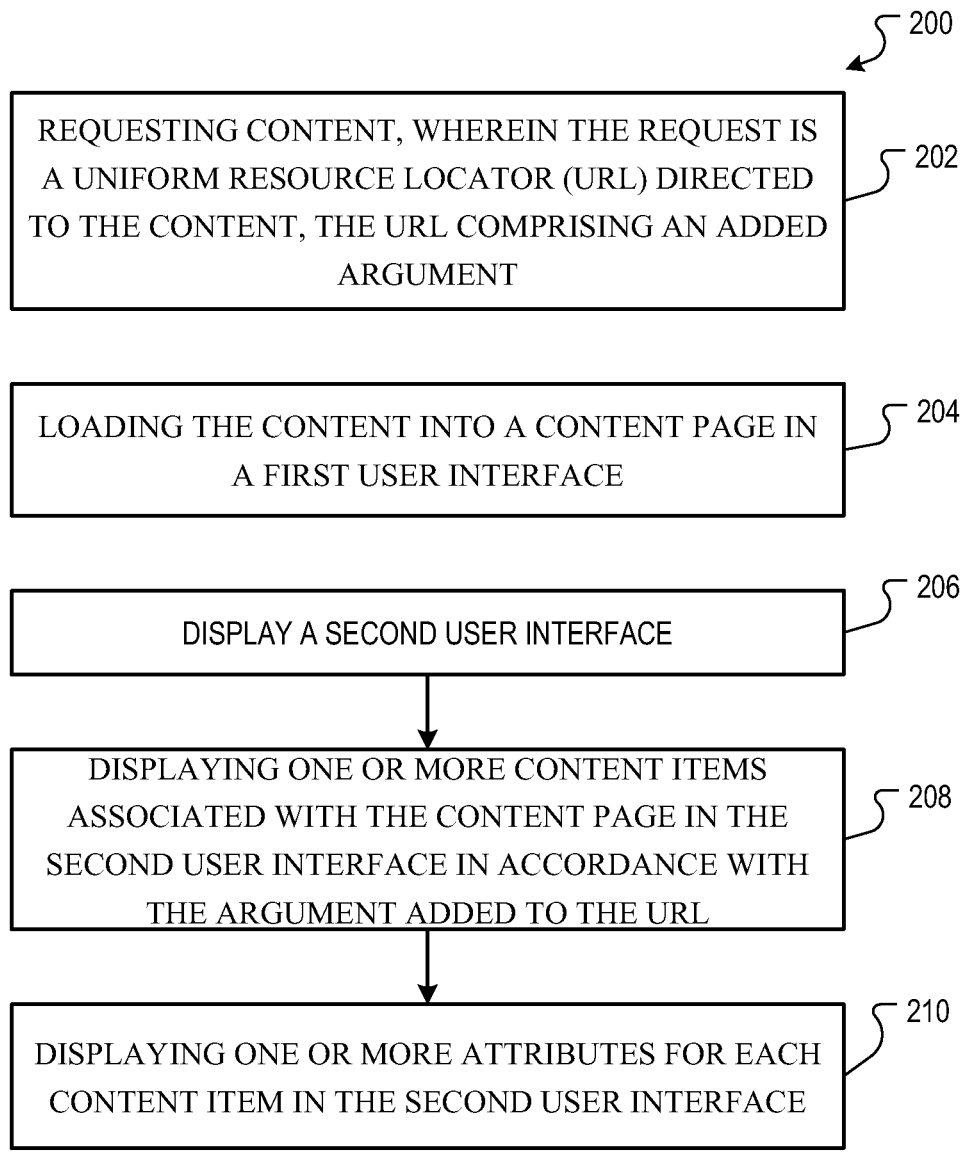
FIG. 2 is an example process for determining the latency time associated with one or more content servers.

Based on this determination, an example process 200 for determining the latency time associated with one or more content servers, such as the second content server 142, is illustrated in FIG. 2. First, content can be requested, wherein the request is a Uniform Resource Locator (URL) directed to the content, the URL comprising an added argument (step 202). The content received in response to the request can be loaded into a content page in a first user interface (step 204). In one implementation, the content loaded into the content page can includes a first portion of content, where the first portion of content only includes content from a publisher server 102.

Next, a second user interface can be displayed (step 206). To display the second user interface, a document containing a script can be requested, where the request includes an indicator. For example, the request can be a Uniform Resource Locator (URL) directed to receive a document and the indicator is an argument added to the URL. The document can then, for example, be received in response to the request. The script can then be executed to display the second user interface in response to receipt of the indicator. For example, the second user interface can be a browser window that is separate from a browser window displaying the content page.

In another implementation, the first and second user interfaces can be displayed in the same interface. The first and second user interfaces can be rendered by a common browser on a common client device. For example, the first and second user interfaces can be rendered in a single user interface, such as a browser window, executing on the client device.

Subsequently, one or more content items e.g., advertisements, associated with the content page can be displayed in the second user interface in accordance with the argument added to the URL (step 208). In addition, one or more attributes for each content item in the second user interface can be displayed (step 210). For example, the displayed attributes can include a load time associated with each content item and a total load time.

In one implementation, displaying the one or more content items can be accomplished by utilizing a client-side implementation. For example, a copy of the one or more content items to be inserted into a content item slot can be received from one or more content servers and saved. An onload callback can then be registered for the content page. During the onload callback, the second user interface is displayed, and a scan is made through the content item slots. After making a scan through the content item slots, all of the code, e.g., HTML code, associated with the content items can be combined. The combined HTML code can then be inserted into the second user interface and all of the content items can be generated.

In another implementation, displaying the one or more content items in the second user interface can be accomplished by utilizing a server-side implementation. For example, one or more content item identifications associated with one or more content items can be captured with JavaScript. A second user interface can then be opened, and a request can be made to one or more content servers for the one or more content items by utilizing the one or more advertisement identifications. The one or more content items received from the one or more content servers can then, for example, be rendered in the second user interface. In an implementation, a load time associated with each content item can be displayed in the second user interface. In an implementation, a total load time can be displayed in the second user interface.

In some implementations, the source code associated with the second user interface can be saved. For example, the user can view and save the source code of the page in the second user interface. Saving the source code can be useful in demonstrating the latency of one or more content items to an operator of a content server responsible for the latency. Specifically, the source code can be used to pinpoint which content item(s), i.e., advertisement(s), produce the most delay in load time. The source code can, for example, be emailed directly to the operator of the content server. The source code can then, for example, be loaded in a user interface, such as a browser, to demonstrate the latency with a particular content item(s).

Figure 3:
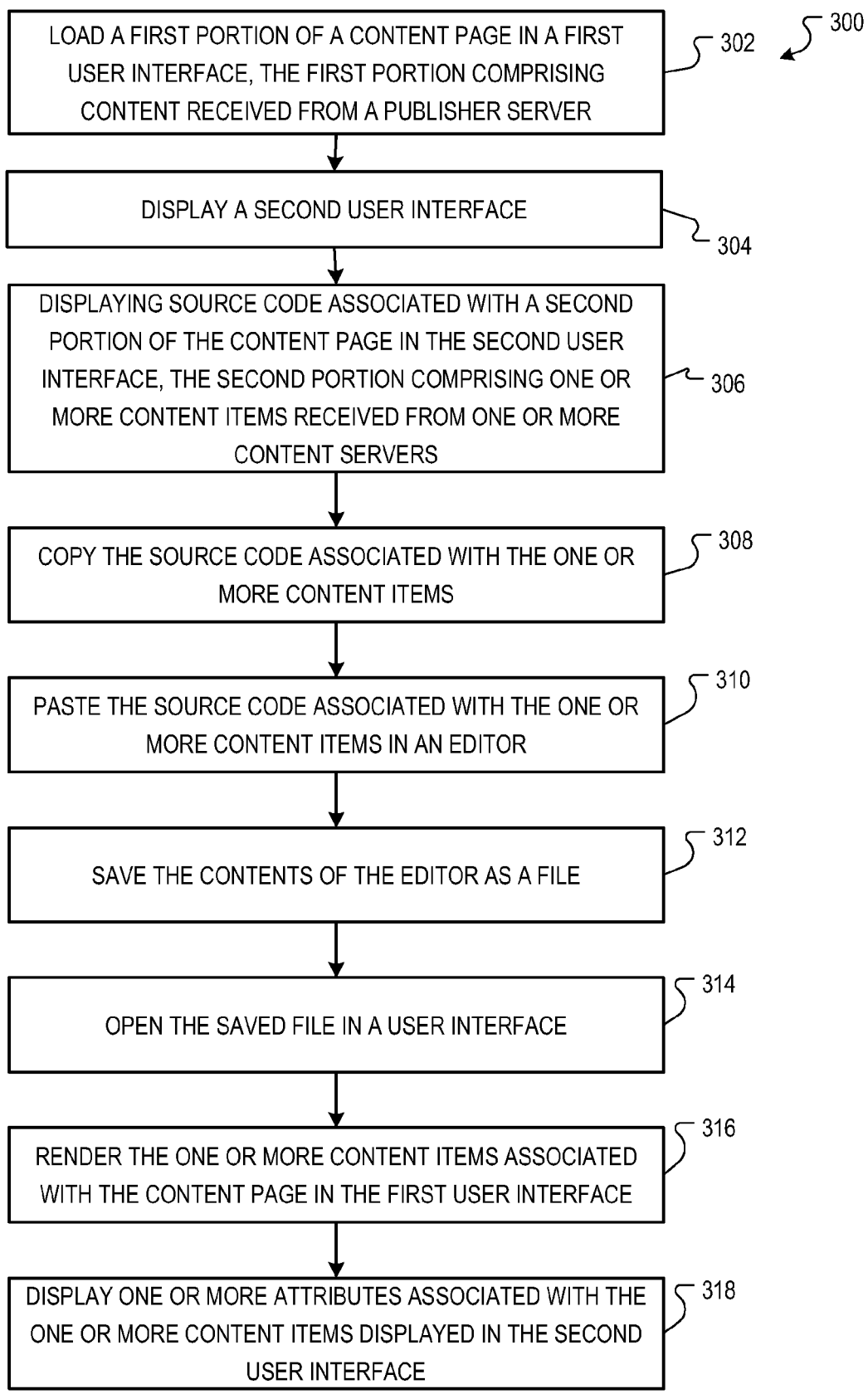
FIG. 3 is another example process for determining the latency time associated with one or more content servers.

Another example process 300 for determining the latency time associated with one or more content servers, such as the second content server 142, is illustrated in FIG. 3. After determining the source of latency associated with a content page, a first portion of a content page can be loaded in a first user interface, where the first portion includes content received from a publisher server (step 302). For example, the first portion of content may not include one or more content items from one or more content servers.

Next, a second user interface can be displayed (step 304). Subsequently, source code, i.e., HTML code, associated with a second portion of the content page can be displayed in the second user interface, where the second portion includes one or more content items received from one or more content servers (step 306). To display the source code, e.g., HTML code, associated with the one or more content items in the second user interface, a document containing a script can be requested, where the request includes an indicator. For example, the request can be a Uniform Resource Locator (URL) directed to receive a document and the indicator is an argument added to the URL. The document can then, for example, be received in response to the request. The script can then be executed to display the second user interface including the source code associated with the one or more content items in response to receipt of the indicator.

For example, the argument "google_capture_norender" can be added to the URL of a web page content location as follows: http://www.webpage.com?google_capture_no-render. In response, a second user interface can be displayed that contains the source code associated with the one or more content items. The source code can then, for example, be copied (step 308), pasted into an editor (step 310), and then saved to a file (step 312), such as a local HTML file. Thereafter a user interface, such as a browser or other user interface, can be utilized to open the file, e.g., the local HTML file, which contains the source code associated with the one or more content items (step 314). When opened, the file can render the one or more content items associated with the content page in the user interface (step 316). In addition, one or more attributes associated with the one or more content items can be displayed in the user interface (step 318). For example, the attributes can include a load time associated with each content item and a total load time associated with the one or more content items.

Figure 4:
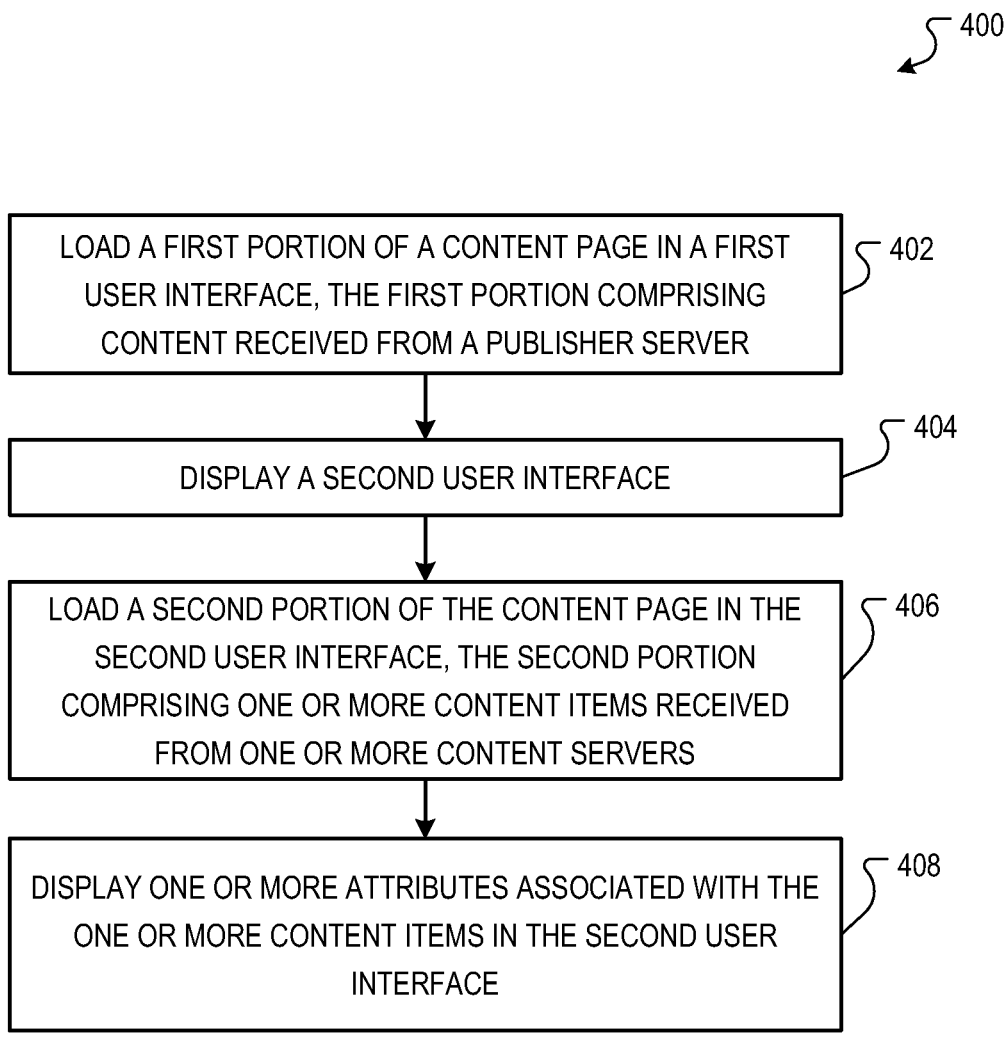
FIG. 4 is another example process for determining the latency time associated with one or more content servers.

FIG. 4 is another example process 400 for determining the latency time associated with one or more content servers, such as the second content server 142. The process 400 begins by loading a first portion of a content page in a first user interface, where the first portion includes content received from a publisher server (step 402). For example, the portion of the content page loaded into the first user interface may not include content from one or more content servers. Next, a second user interface is displayed (step 404). For example, the second user interface can be a window, such as a pop-up window, that is displayed in addition to the first user interface.

A second portion of the content page can then, for example, be displayed in the second user interface, where the second portion includes one or more content items received from one or more content servers (step 406). In addition, one or more attributes associated with the one or more content items can be displayed in the second user interface (step 408). For example, the attributes can include a load time associated with each content item and a total load time associated with the one or more content items.

Figure 5:
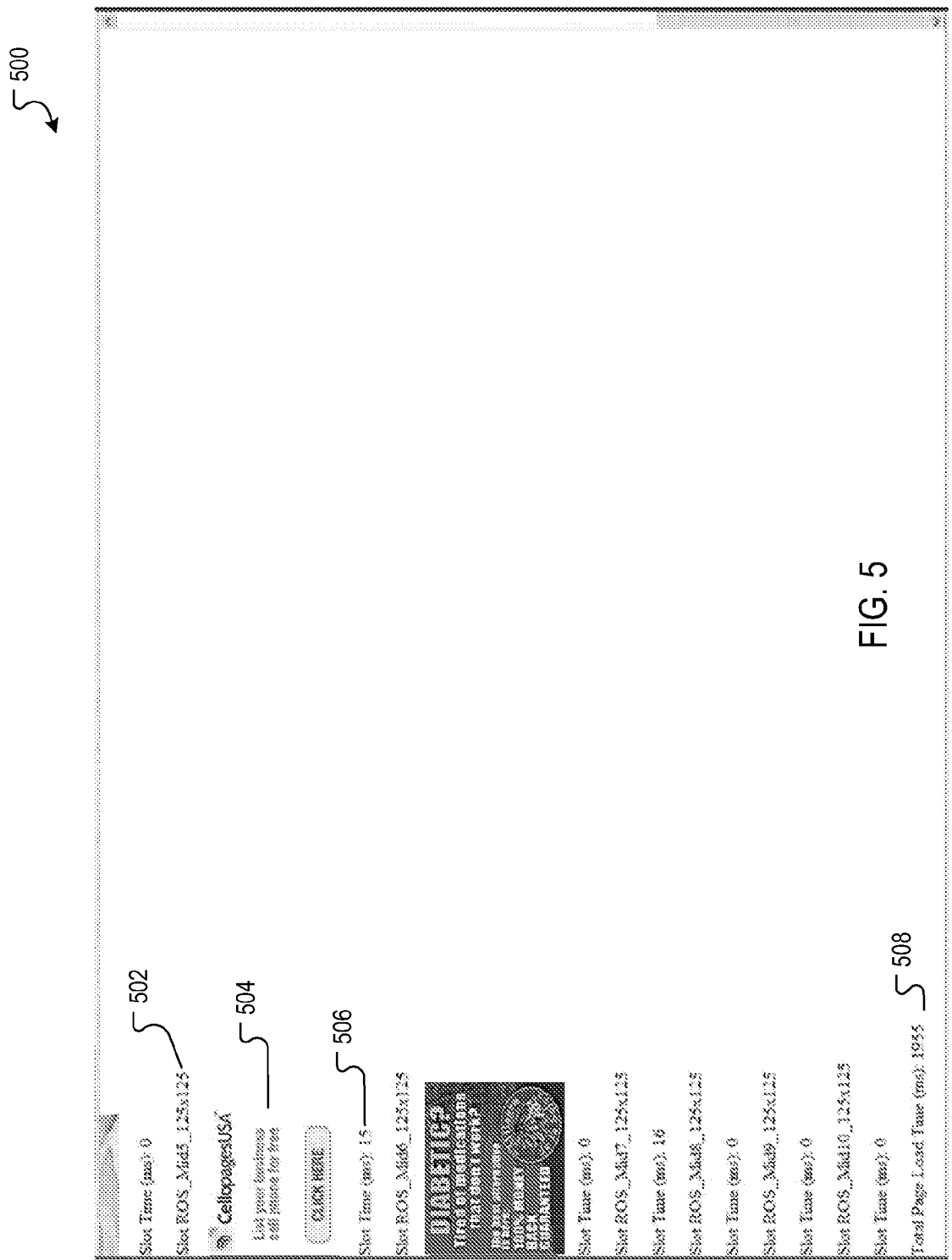
FIG. 5 is an illustration of an example user interface.

FIG. 5 is an illustration of an example second user interface 500 as described in the processes above. As described, one or more attributes associated with the one or more content items can be displayed in the second user interface 500. In one implementation, location and size information 502 associated with each content item can be displayed in the second user interface 500. In another implementation, the content item 504 can be displayed in the second user interface 500. In another implementation, a load time 506 associated with each advertisement can be displayed in the second user interface 500. For example, an individual load time 506 can be associated with the advertisement 504 displayed with the location and size information 502. In another implementation, a total load time 506 can be displayed in the second user interface 500.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method comprising:
receiving requests for advertisements from a client for a plurality of respective advertisement slots of a first web page;
obtaining respective instructions for each of a plurality of advertisements identified as being responsive to the requests, wherein the obtained respective instructions, when executed by the client, cause the client to present one of the advertisements;
generating first instructions that, when executed by the client, cause the client to present the obtained respective instructions in the first web page without executing the obtained respective instructions;
generating second instructions that, when executed by the client, cause the client to execute the obtained respective instructions to present each of the advertisements in a second web page along with a respective load time, wherein the respective load time is a latency attributable to a content server from which the advertisement was requested; and
sending the first and second instructions to the client in response to receiving the requests, wherein when executed by the client, the first instructions cause the client to present the obtained respective instructions in the first web page such that a user of the client can electronically provide a copy of at least a part of the obtained respective instructions to a third party for review of the respective load time.

2. The method of claim 1, wherein the second instructions further cause the client to present a total load time in the second web page, wherein the total load time is a load time for all of the advertisements.

3. The method of claim 1, further comprising:
   receiving a request including an argument indicating that the first instructions are to be presented in the first web page.

4. The method of claim 3, further comprising providing the first instructions for presentation in the first web page.

5. The method of claim 3, wherein the first instructions are in Hypertext Markup Language (HTML).

6. The method of claim 3, wherein the first instructions are in JAVASCRIPT.

7. The method of claim 1, wherein one of the received advertisements was identified by a content server.

8. A system comprising:
   one or more computers configured to perform operations comprising:
   receiving requests for advertisements from a client for a plurality of respective advertisement slots of a first web page;
   obtaining respective instructions for each of a plurality of advertisements identified as being responsive to the requests, wherein the obtained respective instructions, when executed by the client, cause the client to present one of the advertisements;
   generating first instructions that, when executed by the client, cause the client to present the obtained respective instructions in the first web page without executing the obtained respective instructions;
   generating second instructions that, when executed by the client, cause the client to execute the obtained respective instructions to present each of the advertisements in a second web page along with a respective load time, wherein the respective load time is a latency attributable to a content server from which the advertisement was requested; and
   sending the first and second instructions to the client in response to receiving the requests, wherein when executed by the client, the first instructions cause the client to present the obtained respective instructions in the first web page such that a user of the client can electronically provide a copy of at least a part of the obtained respective instructions to a third party for review of the respective load time.

9. The system of claim 8, wherein the second instructions further cause the client to present a total load time in the second web page, wherein the total load time is a load time for all of the advertisements.

10. The system of claim 8, wherein the operations further comprise receiving a request including an argument indicating that the first instructions are to be presented in the first web page.

11. The system of claim 10, wherein the operations further comprise:
    providing the first instructions for presentation in the first web page.

12. The system of claim 10, wherein the first instructions are in Hypertext Markup Language (HTML).

13. The system of claim 10, wherein the first instructions are in JAVASCRIPT.

14. The system of claim 8, wherein one of the received advertisements was identified by a content server.

15. The method of claim 1, wherein the first instructions comprise instructions to register an onload callback for the first web page, wherein the second web page is presented during the onload callback.

16. The method of claim 15, wherein the second instructions comprise instructions of the onload callback that, when executed by the client, cause the client to scan the advertisement slots, generate HTML code for each respective advertisement, and combine the generated HTML code.

17. The method of claim 16, wherein the onload callback is called when the first web page is loaded by the client.

18. The method of claim 1, wherein the advertisements are not presented in the first web page.

19. The system of claim 8, wherein the first instructions comprise instructions to register an onload callback for the first web page, wherein the second web page is presented during the onload callback.

20. The system of claim 19, wherein the second instructions comprise instructions of the onload callback that, when executed by the client, cause the client to scan the advertisement slots, generate HTML code for each respective advertisement, and combine the generated HTML code.

21. The system of claim 20, wherein the onload callback is called when the first web page is loaded by the client.

22. The system of claim 8, wherein the advertisements are not presented in the first web page.

* * * * *